April 12, 1927.  H. E. NORVIEL  1,624,114

CONTROL FIXTURE

Filed Aug. 12, 1924

Inventor
Harry E. Norviel
By Spencer Small and Hardman
his Attorneys

Patented Apr. 12, 1927.

1,624,114

UNITED STATES PATENT OFFICE.

HARRY E. NORVIEL, OF ANDERSON, INDIANA, ASSIGNOR, BY MESNE ASSIGNMENTS, TO DELCO-REMY CORPORATION, OF DAYTON, OHIO, A CORPORATION OF DELAWARE.

CONTROL FIXTURE.

Application filed August 12, 1924. Serial No. 731,689.

This invention relates to devices for manually controlling apparatus located at a distance, and particularly for controlling certain instrument of the automobile from the driver's seat.

One of the objects of the present invention is to provide a fixture which is adapted to be mounted on the instrument board of an automobile and which can be used to control from the driver's seat, an instrument such as a carburetor located under the engine hood.

Further objects and advantages of the present invention will be apparent from the following description, reference being had to the accompanying drawing, wherein a preferred embodiment of one form of the present invention is clearly shown.

Figure 1:
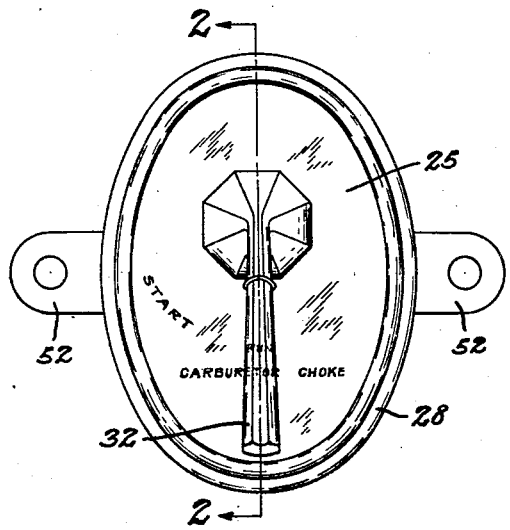
Fig. 1 is a front view of a form of controlling device embodying the present invention.
Figure 2:
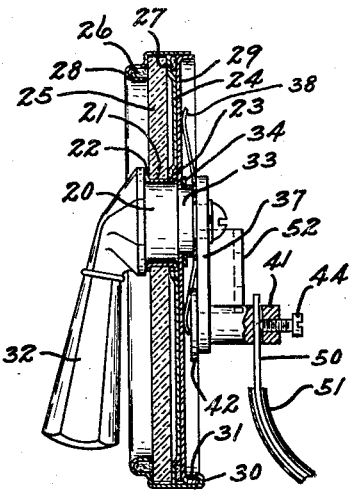
Fig. 2 is a sectional view on the line 2—2.
Figure 3:
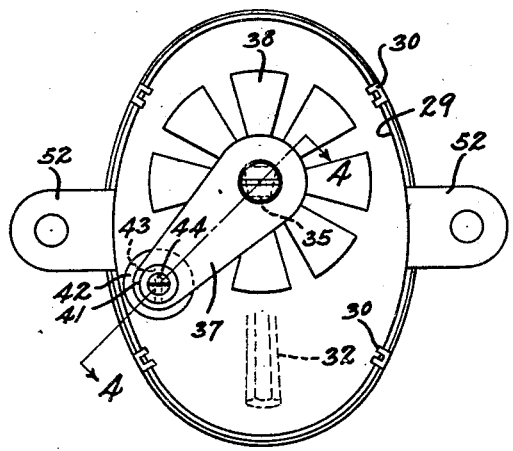
Fig. 3 is a back view of the controlling device.
Figure 4:
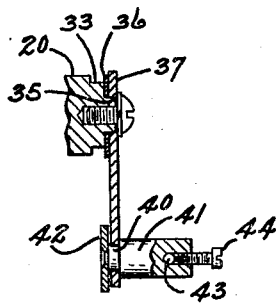
Fig. 4 is a sectional view on line 4—4 of Fig. 3.

Referring to the drawings 20 designates a shaft which is journaled upon a ferrule 21 having flanges 22 and 23 which clamp together a dial plate 24 and a glass cover 25 which protects the lettering on the dial plate 24 such as shown in Fig. 1. The glass is engaged by a felt or the like packing ring 26, and the back of the dial plate is engaged by a washer 27. These parts are secured by clamping them between a bezel ring 28 and a back plate 29. The ring 28 is provided with ears 30 which are bent over the flange 31 of the back plate 29.

The shaft 20 is provided with a handle 32 located in front of the glass cover 25, with a reduced portion 33 extending through the back plate 29 and carrying a washer 34. The inner end of the shaft 20 is provided with portion 35 which is key-stone shaped in cross section and is received by correspondingly shaped holes in washer 36 and in a crank 37. The washer 36 is provided with spring fingers 38 which bear against the back surface of the back plate 29 and provide frictional resistance for preventing accidental movement of shaft 20 due to vibration of the automobile in which the controlling device is used. The crank 37 is provided with an opening adjacent its outer end which loosely receives the reduced portion 40 of a crank pin 41 retained in position by a washer 42 which is riveted adjacent reduced portion 40. The pin 41 is provided with a hole 43 for receiving a "Bowden" wire 50 which extends through a tube 51 and is connected with an instrument to be controlled by a handle 32. Wire 50 is attached to the crank pin 41 by a screw 44.

The bezel ring 28 is adapted to extend through an opening provided in the instrument board of an automobile, and the back plate 29 is provided with apertured ears 52 for receiving screws for attaching the device to the instrument board.

By turning the handle 32 the crank 41 is operated to produce endwise movement of the wire 50 for the purpose of operating an instrument located at a distance from the handle. The resilient spring fingers 38 of washer 36 cooperate with the back plate 29 to hold the handle 32 and wire 50 in the desired position of adjustment.

While the form of embodiment of the invention as herein disclosed, constitutes a preferred form, it is to be understood that other forms might be adopted, all coming within the scope of the claims which follow.

What is claimed is as follows:

1. A manually operable controlling fixture for automobiles comprising, in combination, a plate adapted to be attached to the instrument board of the automobile; a shaft extending through the plate and having a handle adjacent the front of the plate; a washer attached to the shaft adjacent the back of the plate and having resilient fingers bearing against the back of the plate and a crank connected with the shaft adjacent said washer.

2. A manually operable controlling fixture for automobiles comprising, in combination, a mounting plate adapted to be attached to the instrument board of an automobile and provided with a hole; a dial plate adapted to fit against one side of the mounting plate; a transparent cover adapted to fit against the dial plate, the dial plate and cover having holes in alignment with the hole in the mounting plate; a ferrule within the holes in the dial plate and cover and having its ends formed so as to secure the dial plate and cover; a shaft extending through the aligned holes and journaled within said ferrule; a handle connected with the shaft adjacent the cover; a crank connected with the shaft adjacent the mounting plate; and means for securing the cover, dial plate and mounting plate at the edges thereof.

In testimony whereof I hereto affix my signature.

HARRY E. NORVIEL.